(12) United States Patent
Balcacer

(10) Patent No.: US 11,058,247 B1
(45) Date of Patent: Jul. 13, 2021

(54) MULTI-LEMON SQUEEZER

(71) Applicant: Flavia Balcacer, New York, NY (US)

(72) Inventor: Flavia Balcacer, New York, NY (US)

( * ) Notice: Subject to any disclaimer, the term of this patent is extended or adjusted under 35 U.S.C. 154(b) by 0 days.

(21) Appl. No.: 17/168,662

(22) Filed: Feb. 5, 2021

(51) Int. Cl.
*A47J 19/02* (2006.01)
*B30B 9/04* (2006.01)
*A23N 1/00* (2006.01)

(52) U.S. Cl.
CPC ............ *A47J 19/023* (2018.08); *A23N 1/003* (2013.01); *B30B 9/045* (2013.01)

(58) Field of Classification Search
CPC ......... A47J 19/023; A47J 19/02; A23N 1/003; B30B 15/00
USPC ........... 99/504, 507, 508; 100/125, 213, 288
See application file for complete search history.

(56) References Cited

U.S. PATENT DOCUMENTS

| | | | |
|---|---|---|---|
| 1,661,374 A * | 3/1928 | Lacey | A47J 19/02 100/98 R |
| 2,017,960 A * | 10/1935 | Fauids | A47J 19/023 99/504 |
| 2,584,333 A | 2/1952 | Crot | |
| 5,396,838 A | 3/1995 | Casapulla | |
| 6,813,996 B1 | 11/2004 | Kao | |
| 2015/0296842 A1 | 10/2015 | Romano | |

OTHER PUBLICATIONS

U.S. Appl. No. 10/610,041, filed Apr. 7, 2020, Balcacer.

* cited by examiner

*Primary Examiner* — Tu B Hoang
*Assistant Examiner* — Thomas J Ward
(74) *Attorney, Agent, or Firm* — Ruben Alcoba, Esq.

(57) ABSTRACT

A multi-lemon squeezer that is comprised of a frame that supports a gear train and a rack guide. A rack is held within the rack guide and the rack has a press on a bottom end of the rack. The bottom of the press defines a plurality of outward conical structures. The frame defines a base that supports a receptacle that has a removable cover. The removable cover defines a plurality perforated cups that receive the plurality of outward conical structures of the press. A lever attaches to the gear train to provide the force needed to move the rack downward to squeeze any lemons held within the plurality of perforated cups of the removable cover.

7 Claims, 4 Drawing Sheets

MULTI-LEMON SQUEEZER

BACKGROUND

The present invention is directed to an improved multi-lemon squeezer.

The present invention is an improvement of the inventor's prior issued patent, U.S. Pat. No. 10,610,041, titled Lemon Squeezer.

The "041" device used a lever mechanism to apply the pressure needed to squeeze a plurality of lemons. The "041" device was a very useful device, yet the inventor noticed that some users did not have the needed strength to use the "041" device.

The inventor realized that she needed to develop a lemon squeezer that would reduce the force needed to squeeze lemons.

Through trial and error, she realized that the most efficient way of reducing the force needed to squeeze the plurality of lemons using a lemon squeezer would be by using a lever powered gear train that would transfer the rotating force of the gear train to a vertical rack that would have a press on one end that would press onto a lemon holding platform.

In a preferred embodiment, the present invention uses a linear gear train that has a ratio, from the input gear to the output gear, that is four to one and wherein the cogs of the input gear and the output gear are of equal size. The input gear in the preferred embodiment has a diameter that is four times the size of the diameter of the output gear. The present invention exponentially reduces the force needed to squeeze the lemons, when compared to the "041" device.

For the foregoing reason, there is a need for an improved lemon squeezer that will squeeze a plurality of lemons using less force than what was required with the "041" device.

SUMMARY

The present invention describes a multi-lemon squeezer that minimizes mechanical force needed to squeeze a plurality of lemons.

The multi-lemon squeezer is comprised of a frame that supports a gear train and a rack guide. A rack is held within the rack guide and the rack has a press on a bottom end of the rack. The bottom of the press defines a plurality of outward conical structures. The frame defines a base that supports a receptacle that has a removable cover. The removable cover defines a plurality of perforated cups that receive the plurality of outward conical structures. A lever attaches to the gear train to provide the force needed to move the rack downward to squeeze any lemons held within the plurality of perforated cups of the removable cover.

An object of the present invention is to provide a multi-lemon squeezer that reduces the force needed to squeeze a plurality of lemons.

Another object of the present invention is to provide a multi-lemon squeezer that will not tilt when a plurality of lemons is squeezed.

DRAWINGS

Figure 1:
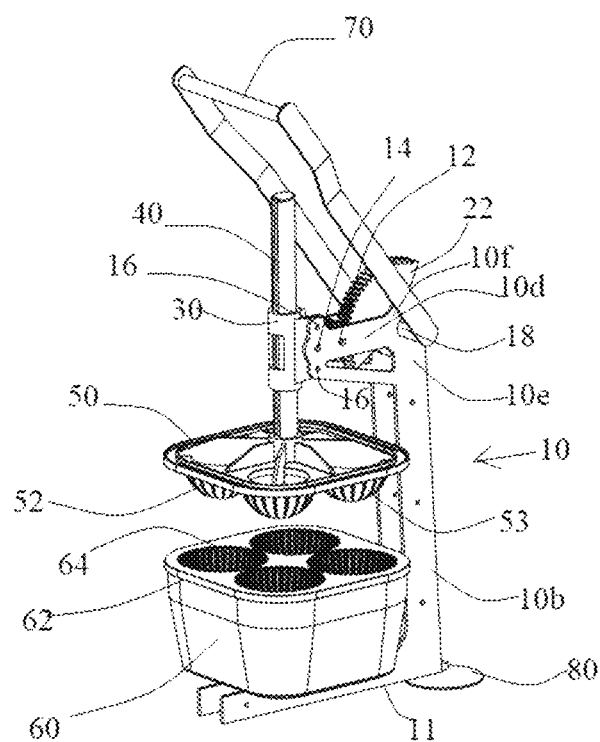
Figure 2:
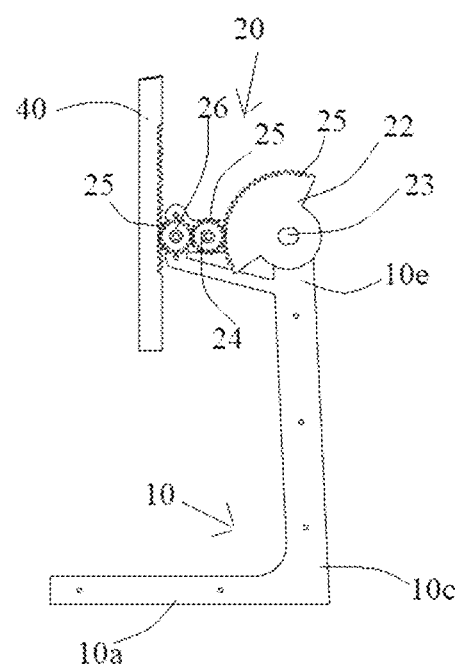
Figure 3:
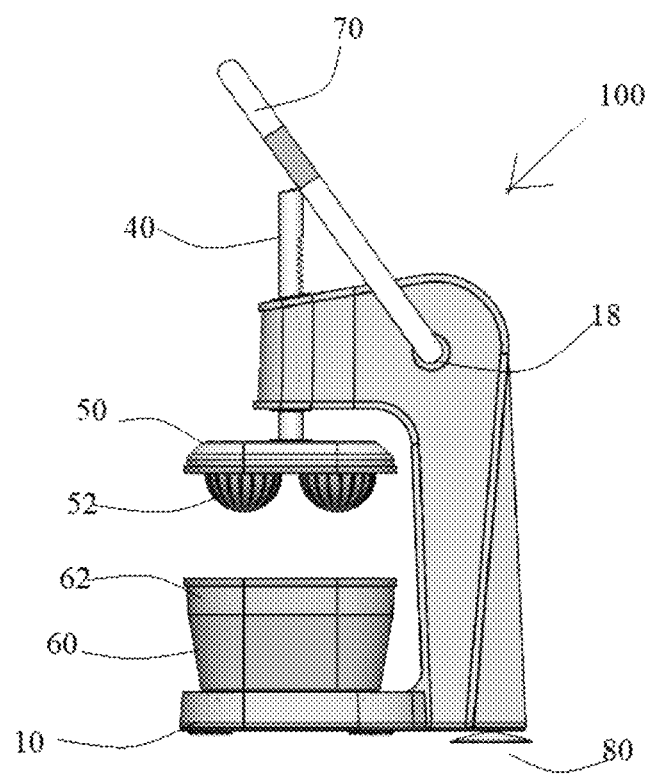
Figure 4:
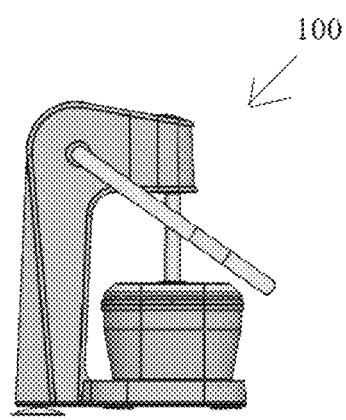

These and other features, aspects, and advantages of the present invention will become better understood with regards to the following description, appended claims, and drawings where:

FIG. 1 is a perspective view of a multi-lemon squeezer;
FIG. 2 is a side view of the mechanism of the present invention;
FIG. 3 is a left side view of the present invention, the view shows a cover over the functional elements of the invention; and
FIG. 4 is a right side view of the present invention, the view shows a cover over the functional elements of the invention.

DESCRIPTION

As seen in FIGS. 1-4, The present invention is directed to a multi-lemon squeezer 100. The multi-lemon squeezer 100 comprises of a frame 10 having a base 10a, a vertical support 10b that runs upward from a rear part of the base 10c, a horizontal brace 10d that runs horizontally from an upper section 10e of the vertical support 10b in a direction that is parallel to the base 10a, the horizontal brace 10d defines a first gear aperture 12, a second gear aperture 14, and a pair of vertical guide apertures 16, a drive gear aperture 18 is defined on a central top section of the vertical support 10f. A gear train 20 that is comprised of a drive gear 22, an idle gear 24, and a pinion gear 26, the drive gear 22 is secured on the drive gear aperture 18, the idle gear 24 is secured on the first gear aperture 12, and the pinion gear 26 is secured on the second gear aperture 14. A vertical guide 30 is secured on to the pair of vertical guide apertures 16. A rack 40 that is placed within the vertical guide 30 that is operatively connected to the pinion gear 26. A press 50 that is fixedly attached to a bottom section 40a of the rack 40, the press 50 defines a plurality of outward conical structures 52. A receptacle 60 that has a removable top 62, the removable top 62 defines a plurality of perforated cups 64, the receptacle 60 is secured on the base 10a of the frame 10 so that the plurality of outward conical structures 52 of the press 50 align over the plurality of perforated cups 64. And, a lever 70 that attaches to an axle 23 that extends from both sides of the drive gear 22.

In an embodiment of the present invention, a suction cup 80 attaches to a bottom section of the base 11 that is linearly aligned to the vertical support 10b.

In another embodiment of the present invention, the pinion gear 26, the guide gear 24, and the drive gear 22 all define equally dimensioned cogs 25.

In yet another embodiment of the present invention, the drive gear 22 has a greater diameter than the pinion gear 26. In a preferred embodiment, the diameter of the drive gear 22 is at least four times greater than the diameter of the pinion gear 26.

In still another embodiment of the present invention, the outward conical structures of the press 52 define a plurality of cutting channels 53.

In yet still another embodiment of the present invention, the lever 70 is U-shaped.

An advantage of the present invention is that it provides a multi-lemon squeezer that reduces the force needed to squeeze a plurality of lemons.

Another advantage of the present invention is that it provides a multi-lemon squeezer that does not tilt when a plurality of lemons are squeezed.

While the inventor's above description contains many specificities, these should not be construed as limitations on the scope, but rather as an exemplification of several preferred embodiments thereof. Accordingly, the scope should not be determined by the embodiments illustrated, but by the appended claims and their legal equivalents.

What is claimed is:

1. A multi-lemon squeezer, the multi-lemon squeezer comprises:

A frame having a base, a vertical support that runs upward from a rear part of the base, a horizontal brace that runs horizontally from an upper section of the vertical support in a direction that is parallel to the base, the horizontal brace defines a first gear aperture, a second gear aperture, and a pair of vertical guide apertures, a drive gear aperture is defined on a central top section of the vertical support;

A gear train that is comprised of a drive gear, an idle gear, and a pinion gear, the drive gear is secured on the drive gear aperture, the idle gear is secured on the first gear aperture, and the pinion gear is secured on the second gear aperture;

A vertical guide is secured on to the pair of vertical guide apertures;

A rack that is placed within the vertical guide that is operatively connected to the pinion gear;

A press that is fixedly attached to a bottom section of the rack, the press defines a plurality of outward conical structures;

A receptacle that has a removable top, the removable top defines a plurality of perforated cups, the receptacle is secured on the base of the frame so that the plurality of outward conical structures of the press align over the plurality of perforated cups; and A lever that attaches to an axle that extends from both sides of the drive gear.

2. The multi-lemon squeezer of claim 1, the multi-lemon squeezer further comprises of a suction cup that is attached to a bottom section of the base that is linearly aligned to the vertical support.

3. The multi-lemon squeezer of claim 2, wherein the pinion gear, the guide gear, and the drive gear all define equally dimensioned cogs.

4. The multi-lemon squeezer of claim 3, wherein the drive gear has a greater diameter than the pinion gear.

5. The multi-lemon squeezer of claim 4, wherein the diameter of the drive gear is at least four times greater than the diameter of the pinion gear.

6. The multi-lemon squeezer of claim 5, wherein the outward conical structure defines a plurality of cutting channels.

7. The multi-lemon squeezer of claim 1, wherein the lever is U-shaped.

\* \* \* \* \*